(12) United States Patent
Kobayashi et al.

(10) Patent No.: US 7,836,006 B2
(45) Date of Patent: Nov. 16, 2010

(54) BEHAVIOR PREDICTION APPARATUS AND METHOD

(75) Inventors: Hideki Kobayashi, Yokohama (JP); Yoshiyuki Hondo, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 660 days.

(21) Appl. No.: 11/857,068

(22) Filed: Sep. 18, 2007

(65) Prior Publication Data

US 2008/0097950 A1   Apr. 24, 2008

(30) Foreign Application Priority Data

Oct. 18, 2006 (JP) ............................. 2006-284232
Jul. 30, 2007 (JP) ............................. 2007-197400

(51) Int. Cl.
*G06N 5/00* (2006.01)

(52) U.S. Cl. .......................................... 706/52; 706/45

(58) Field of Classification Search ................... 706/52, 706/45

See application file for complete search history.

(56) References Cited

U.S. PATENT DOCUMENTS

2007/0073568 A1   3/2007   Kobayashi

OTHER PUBLICATIONS

Page, et al, Skewing: An Efficient Alternative to Lookahead for Decision Tree Induction, Proceedings of the 18th International Joint Conference on Artificial Intelligence (IJCAI-2003), 2003, pp. 1-7.*

U.S. Appl. No. 11/531,453, filed Sep. 13, 2006, Hideki Kobayashi, et al.

Yuko Kanamori, et al., "Modeling on household consumption and generation of enviornmental load in Japan", Proc. EcoBalance, Oct. 25, 2004, pp. 399-402.

Koji Takase, et al., "A analysis of consumers' behavior by the waste input-output model: Environmental impact of outcome and time use", Journal of Life Cycle Assessment, Japan, vol. 2, No. 1, Jan. 2006, pp. 48-55.

J. N. Kapur, et al., "Entropy Optimization Principles with Applications", Academic Press, Inc., pp. 151-203.

* cited by examiner

*Primary Examiner*—Wilbert L Starks, Jr.
(74) *Attorney, Agent, or Firm*—Oblon, Spivak, McClelland, Maier & Neustadt, L.L.P.

(57) ABSTRACT

A behavior estimation apparatus inputs a prediction period, an annual consumption expenditure, extracts, from behavioral statistical data including an occurrence probability of each of behaviors of human during each time period, the occurrence probability of each behavior within the prediction period as a prior probability distribution, obtains a consumption time ratio between replaceable behaviors, and calculates estimated occurrence probabilities of the behaviors which minimize a Kullback-Leibler divergence with respect to the prior probability distribution and satisfy a condition that a ratio between estimated occurrence probabilities of the replaceable behaviors within the prediction period equals a consumption time ratio between the replaceable behaviors, a condition that a sum of expenditures of the behaviors per unit time equals an expenditure per unit time calculated from the annual consumption expenditure, and a condition that a sum of the occurrence probabilities and a sum of the estimated occurrence probabilities are "1".

19 Claims, 17 Drawing Sheets

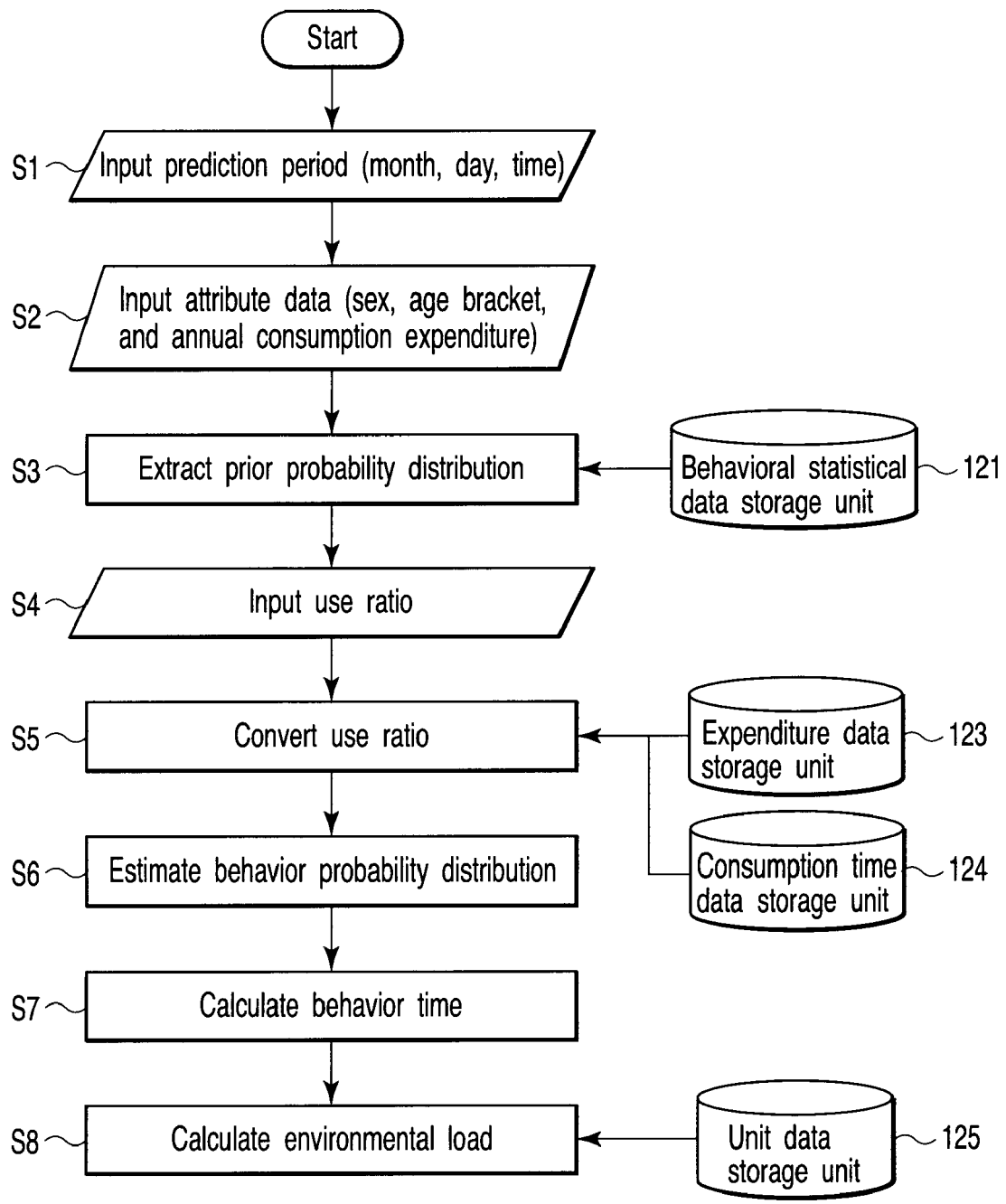
F I G. 2

Woman in 30-39 age bracket with annual consumption expenditure of 4,000,000 to 5,000,000 yen 4 February, Sunday, 8:00 to 10:00

| Behavior | | Behavior occurrence probability |
|---|---|---|
| 1 | Washing | 0.10 |
| 2 | Eating | 0.08 |
| 3 | Dishwashing | 0.17 |
| | | |
| i | | $q_i$ |
| | | |
| | Using toilet | 0.08 |
| | Watching TV | 0.3 |
| | Sleep | 0.08 |
| N-2 | Move (train) | 0.08 |
| N-1 | Move (car) | 0.03 |
| N | Move (walking) | 0.05 |
| | Sum of occurrence probabilities | 1 |

FIG. 3

- ♦ Sleep
- ■ Affairs of personal life
- ▲ Eating
- ✕ Commute
- ✱ Work
- ● Schoolwork
- + Household affairs
- — Nursing care
- — Baby and child care
- ♦ Shopping
- ■ Move (excluding commute)
- ▲ TV, radio, newspapers, and magazines
- ✕ Recreation and relaxation
- ✱ Learning and study (except schoolwork)
- ● Hobbies and entertainment
- + Sports
- — Voluntary activities and social services
- — Associations and companies
- ♦ Taking of examinations and medical care
- ■ Others
- ▲ Sleep
- ✕ Affairs of personal life
- ✱ Eating
- ● Commute
- + Work
- — Schoolwork
- — Household affairs
- ♦ Nursing care
- ■ Baby and child care
- ▲ Shopping
- ✕ Move (excluding commute)
- ✱ TV, radio, newspapers, and magazines
- ● Recreation and relaxation
- + Learning and study (except schoolwork)
- — Hobbies and entertainment
- — Sports
- ♦ Voluntary activities and social services
- ■ Associations and companies
- ▲ Taking of examinations and medical care
- ✕ Others

FIG. 4B

| Behaviors | Details of behaviors | Environmental load unit (CO2-kg/H) |
|---|---|---|
| Sleep | | 0.0007 |
| Affairs of personal life | | 0.5357 |
| Eating | | 0.2893 |
| Commute | | 1.2732 |
| Work | System engineering | 2.6003 |
| Schoolwork | | 0.0046 |
| Household affairs | | 0.0375 |
| Nursing care | | 0.1500 |
| Baby and child care | | 0.1500 |
| Shopping | | 2.0465 |
| Move (train) | | 1.7803 |
| Move (bus) | | 2.0371 |
| Move (car) | | 7.1301 |
| Move (bicycle) | | 0.0000 |
| Move (walking) | | 0.0000 |
| TV, radio, newspapers, and magazines | | 0.1500 |

FIG. 6

| Places | Behaviors that do not occur |
|---|---|
| Place of work | Sleep, schoolwork, household, affairs, nursing care, baby and child care, shopping, recreation and relaxation, hobbies and entertainments, baseball, bowling, voluntary activities and social services, associations and companies |
| ... | ... |
| Home | Commute, schoolwork |
| School | Sleep, affairs of personal life, eating, work, hosehold affairs, nursing care, baby and child care, shopping, move |

FIG. 10

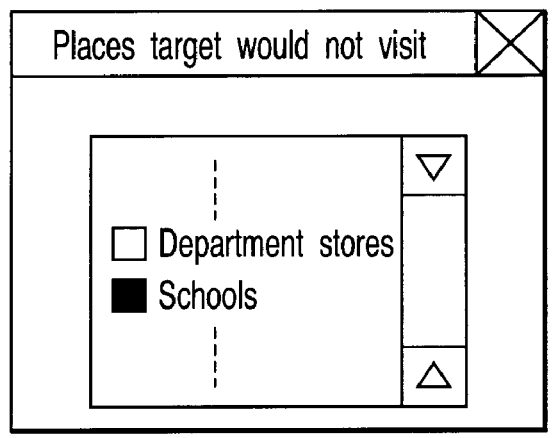

FIG. 11

| No. | Behaviors | Details of behaviors | Consumption calories |
|---|---|---|---|
| 1 | Sleep | | 0.016 |
| 2 | Affairs of personal life | | 0.027 |
| 3 | Eating | | 0.025 |
| ... | ... | ... | ... |
| 20 | Learning and study (except schoolwork) | Personal conputer, etc. | 0.029 |
| 21 | Learning and study (except schoolwork) | Commercial practices | 0.029 |
| 22 | Learning and study (except schoolwork) | Affairs associated nursing care | 0.094 |
| 23 | Learning and study (except schoolwork) | Housekeeping and household affairs | 0.046 |
| 24 | Learning and study (except schoolwork) | Humanities and social and natural sciences | 0.022 |
| 25 | Learning and study (except schoolwork) | Art and culture | 0.022 |
| 26 | Learning and study (except schoolwork) | Others | 0.022 |
| 27 | Hobbies and entertainments | Watching sports | 0.027 |

FIG. 12

| No. | Behavior | Fitness / personal |
|---|---|---|
| 1 | Bathing | 1.958 |
| 2 | Cooking | 5.773 |
| 3 | Eeating | 1.831 |
| ... | ... | ... |
| 20 | Move (stairs) | 3.408 |
| 21 | TV, radio, newspapers, and magazines | 0.509 |
| 22 | Face washing | 0.229 |

FIG. 13

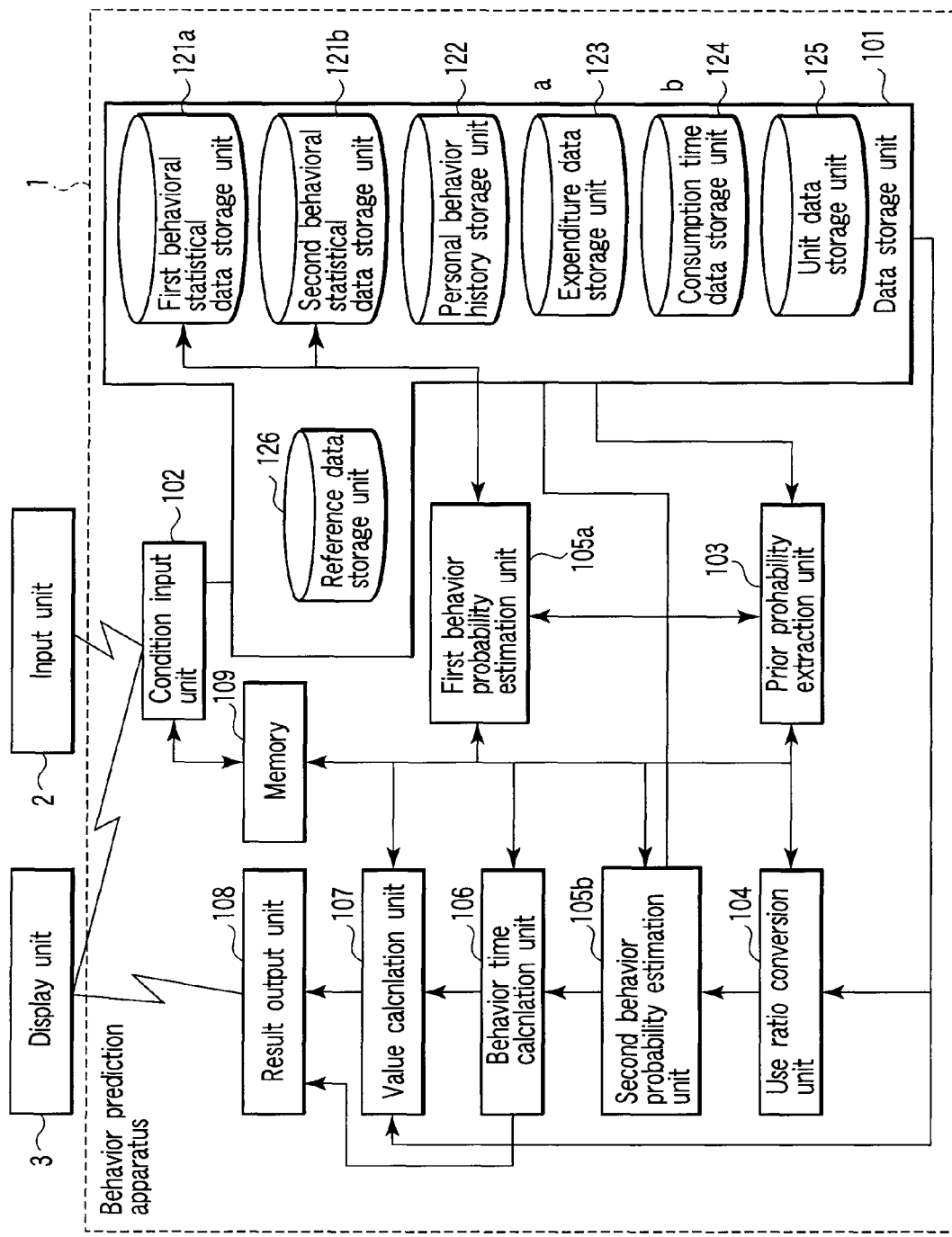
F I G. 14

| Attribute | | Sex | Men | | | | | | Women | | | | |
|---|---|---|---|---|---|---|---|---|---|---|---|---|---|
| | | Age bracket | 15-24 | 25-34 | 35-44 | 45-54 | 55-64 | 65-? | 35-44 | 45-54 | 55-64 | 65-74 | 74- |
| | Sleep | | 7.56 | 7.34 | 7.15 | 7.24 | 7.39 | | 7.07 | 6.53 | 7.25 | 7.46 | 8.56 |
| | Affairs of personal life | | 0.57 | 0.56 | 1 | 0.56 | 1.1 | | 1.22 | 1.18 | 1.2 | 1.28 | 1.44 |
| | Eating | | 1.25 | 1.27 | 1.32 | 1.4 | 1.52 | | 1.36 | 1.44 | 1.54 | 2.03 | 2.05 |
| | Commute | | 1.04 | 1.05 | 1.15 | 1.15 | 0.54 | | 0.25 | 0.25 | 0.15 | 0.06 | 0 |
| | Work | | 2.4 | 6.57 | 7.39 | 6.52 | 4.42 | | 2.31 | 2.43 | 1.59 | 0.46 | 0.21 |
| | Schoolwork | | 2.27 | 0.06 | 0.01 | 0 | 0 | | 0 | 0 | 0 | - | - |
| Behavior | Household affairs | | 0.05 | 0.07 | 0.06 | 0.11 | 0.21 | | 3.56 | 3.56 | 3.32 | 3.3 | 2.1 |
| | Nursing care | | 0 | 0 | 0 | 0.01 | 0.03 | | 0.04 | 0.07 | 0.09 | 0.04 | 0.03 |
| | Baby and child care | | 0.01 | 0.1 | 0.1 | 0.02 | 0.02 | | 0.51 | 0.03 | 0.05 | 0.02 | 0 |
| | Shopping | | 0.17 | 0.17 | 0.14 | 0.12 | 0.18 | | 0.42 | 0.44 | 0.47 | 0.4 | 0.32 |
| | Move (excluding commute) | | 0.32 | 0.31 | 0.31 | 0.37 | 0.36 | | 0.42 | 0.38 | 0.37 | 0.39 | 0.21 |
| | TV, radio, newspapers, and magazines | | 1.56 | 1.53 | 1.42 | 2.14 | 2.55 | 4.0? | 1.5 | 2.26 | 2.35 | 3.11 | 3.57 |
| | Recreation and relaxation | | 1.24 | 1.09 | 1.02 | 1.02 | 1.03 | 1.3? | 1.11 | 1.14 | 1.07 | 1.24 | 2.07 |
| | Learning and study (except schoolwork) | | 0.44 | 0.09 | 0.1 | 0.08 | 0.09 | 0.17 | 0.09 | 0.07 | 0.08 | 0.09 | 0.01 |
| | Hobbies and entertainment | | 1.15 | 0.58 | 0.33 | 0.39 | 1 | 1.01 | 0.29 | 0.31 | 0.51 | 0.53 | 0.26 |
| | Sports | | 0.19 | 0.07 | 0.13 | 0.09 | 0.2 | 0.26 | 0.12 | 0.07 | 0.12 | 0.11 | 0.03 |
| | Voluntary activities and social services | | 0.02 | 0.02 | 0.02 | 0.03 | 0.05 | 0.07 | 0.07 | 0.06 | 0.08 | 0.07 | 0 |
| | Associations and companies | | 0.42 | 0.24 | 0.23 | 0.21 | 0.23 | 0.14 | 0.19 | 0.28 | 0.26 | 0.27 | 0.02 |
| | Taking of examinations and medical care | | 0.06 | 0.04 | 0.03 | 0.04 | 0.07 | 0.14 | 0.04 | 0.1 | 0.08 | 0.17 | 0.22 |
| | Others | | 0.09 | 0.05 | 0.09 | 0.09 | 0.21 | 0.2 | 0.21 | 0.2 | 0.2 | 0.17 | 0.31 |

F I G. 16

Data about group in Kanagawa Prefecture

| Attribute | | Sex | | Total |
|---|---|---|---|---|
| | | Men | Women | |
| Age bracket | 15-24 | 400 | 390 | 790 |
| | 24-34 | 850 | 900 | 1,750 |
| | 35-44 | 910 | 830 | 1,740 |
| | 45-54 | 640 | 500 | 1,140 |
| | 55-64 | 200 | 200 | 400 |
| | 65-74 | 140 | 160 | 300 |
| | 74- | 80 | 70 | 150 |
| | Total | 3,220 | 3,050 | 6,270 |

F I G. 17

Table A (Men in 15-24 age bracket)

| Behavior | Behavior time | Occurrence probability of behavior |
|---|---|---|
| Sleep | 7.56 | 0.315 |
| Affairs of personal life | 0.57 | 0.024 |
| Eating | 1.25 | 0.052 |
| Commute | 1.04 | 0.043 |
| Work | 2.4 | 0.100 |
| Schoolwork | 2.27 | 0.095 |
| Household affairs | 0.05 | 0.002 |
| Nursing care | 0 | 0.000 |
| Baby and child care | 0.01 | 0.000 |
| Shopping | 0.17 | 0.007 |
| Move (excluding commute) | 0.32 | 0.013 |
| TV, radio, newspapers, and magazines | 1.56 | 0.065 |
| Recreation and relaxation | 1.24 | 0.052 |
| Learning and study (except schoolwork) | 0.44 | 0.018 |
| Hobbies and entertainment | 1.15 | 0.048 |
| Sports | 0.19 | 0.008 |
| Voluntary activities and social services | 0.02 | 0.001 |
| Associations and companies | 0.42 | 0.017 |
| Taking of examinations and medical care | 0.06 | 0.002 |
| Others | 0.09 | 0.004 |

Table B

| Estimated behavior probability | Estimated behavior time |
|---|---|
| 0.344 | 8.260 |
| 0.041 | 0.989 |
| 0.061 | 1.475 |
| 0.046 | 1.111 |
| 0.116 | 2.776 |
| 0.106 | 2.551 |
| 0.004 | 0.087 |
| 0.000 | 0.000 |
| 0.001 | 0.017 |
| 0.012 | 0.295 |
| 0.023 | 0.555 |
| 0.084 | 2.013 |
| 0.061 | 1.458 |
| 0.032 | 0.764 |
| 0.054 | 1.301 |
| 0.014 | 0.330 |
| 0.001 | 0.035 |
| 0.000 | 0.000 |
| 0.000 | 0.000 |
| 0.000 | 0.000 |

Estimate →

Correct to known data →

| Class | | Men | | | | Women | | | | Sum of behavior times of each behavior sum (i) | Occurrence probability |
|---|---|---|---|---|---|---|---|---|---|---|---|
| | Sex / Age bracket | 15-24 | 25-34 | 35-44 | 45-54 | 45-54 | 55-64 | 65-74 | 74- | | |
| Behavior | Sleep | 7.56 | 7.34 | 7.15 | 7 | 6.53 | 7.25 | 7.46 | 8.56 | 45521 | 0.343 |
| | Affairs of personal life | 0.57 | 0.56 | 1 | 0 | 1.18 | 1.2 | 1.28 | 1.44 | 6181.5 | 0.047 |
| | Eating | 1.25 | 1.27 | 1.32 | 1 | 1.44 | 1.54 | 2.03 | 2.05 | 8827.3 | 0.066 |
| | Commute | 1.04 | 1.05 | 1.15 | 1 | 0.25 | 0.15 | 0.06 | 0 | 4341.7 | 0.033 |
| | Work | 2.4 | 6.57 | 7.39 | 6 | 2.43 | 1.59 | 0.46 | 0.21 | 25489 | 0.192 |
| | Schoolwork | 2.27 | 0.06 | 0.01 | 0 | 0 | 0 | 0 | 0 | 1883.2 | 0.014 |
| | Household affairs | 0.05 | 0.07 | 0.06 | 0 | 3.56 | 3.32 | 3.3 | 2.1 | 8468.9 | 0.064 |
| | Nursing care | 0 | 0 | 0 | 0 | 0.07 | 0.09 | 0.04 | 0.03 | 131.9 | 0.001 |
| | Baby and child care | 0.01 | 0.1 | 0.1 | 0 | 0.03 | 0.05 | 0.02 | 0 | 1899.4 | 0.014 |
| | Shopping | 0.17 | 0.17 | 0.14 | 0.12 | 0.44 | 0.47 | 0.4 | 0.32 | 1680 | 0.013 |
| | Move (excluding commute) | 0.32 | 0.31 | 0.31 | 0.37 | 0.38 | 0.37 | 0.39 | 0.21 | 2232.2 | 0.017 |
| | TV, radio, newspapers, and magazines | 1.56 | 1.53 | 1.42 | 2.14 | 2.26 | 2.35 | 3.11 | 3.57 | 11552.9 | 0.087 |
| | Recreation and relaxation | 1.24 | 1.09 | 1.02 | 1.02 | 1.14 | 1.07 | 1.24 | 2.07 | 7061.3 | 0.053 |
| | Learning and study (except schoolwork) | 0.44 | 0.09 | 0.1 | 0.08 | 0.07 | 0.08 | 0.09 | 0.01 | 816.1 | 0.006 |
| | Hobbies and entertainment | 1.15 | 0.58 | 0.33 | 0.39 | 0.31 | 0.51 | 0.53 | 0.26 | 2894.5 | 0.022 |
| | Sports | 0.19 | 0.07 | 0.13 | 0.09 | 0.07 | 0.12 | 0.11 | 0.03 | 652.3 | 0.005 |
| | Voluntary activities and social services | 0.02 | 0.02 | 0.02 | 0.03 | 0.06 | 0.08 | 0.07 | 0 | 234 | 0.002 |
| | Associations and companies | 0.42 | 0.24 | 0.23 | 0.21 | 0.28 | 0.26 | 0.27 | 0.02 | 1621.6 | 0.012 |
| | Taking of examinations and medical care | 0.06 | 0.04 | 0.03 | 0.04 | 0.1 | 0.08 | 0.17 | 0.22 | 379.8 | 0.003 |
| | Others | 0.09 | 0.05 | 0.09 | 0.09 | 0.2 | 0.2 | 0.17 | 0.31 | 902.5 | 0.007 |
| | Number of persons | 400 | 850 | 910 | 640 | 500 | 200 | 160 | 70 | 132771.1 | 1 |

Sum (S) of behavior times of all behaviors

US 7,836,006 B2

BEHAVIOR PREDICTION APPARATUS AND METHOD

CROSS-REFERENCE TO RELATED APPLICATIONS

This application is based upon and claims the benefit of priority from prior Japanese Patent Applications No. 2006-284232, filed Oct. 18, 2006; and No. 2007-197400, filed Jul. 30, 2007, the entire contents of both of which are incorporated herein by reference.

BACKGROUND OF THE INVENTION

1. Field of the Invention

The present invention relates to a method and apparatus for predicting the behavior time of a person.

2. Description of the Related Art

The problems of global warming and the control/management of chemical substances are now making society recognize that resources/energy and environmental capacity are not infinite. Under these circumstances, manufacturers are concentrating their efforts on developing goods and services with less environmental loads by adopting resource- and energy-saving technologies and pursuing recyclability. However, it is evident that such measures on the manufacturer side are not sufficient to establish a sustainable society. Especially, people cannot always select and practice living behaviors with less environmental loads. For example, a transportation means to take for a certain place and how to use a surplus time are hard to uniquely determine because they are closely associated with the senses of values, preferences, and life habits of individuals. To reduce the environmental load in the whole society, it is necessary to realize so-called "sustainable consumption" not only by reducing environmental loads directly generated upon producing and wasting goods and services but also by reducing environmental loads of consumption behaviors indirectly induced by the goods and services.

If a time necessary for achieving a desired purpose decreases, the operating time of goods and services also decreases. Hence, the consumption energy can also decrease at a high probability as the secondary effect. However, if much energy is consumed for another activity in a surplus time, the energy consumption within the same time may eventually be higher than that before introduction of the new goods and services. This side effect is called a rebound effect. A rebound effect can be observed when, e.g., "leisure time produced as a result of electronic commerce leads to an increase in number of times of travel". To control the total environmental load generated in the whole society, it is necessary to evaluate not only environmental loads generated by goods and services themselves as ever but also environmental loads including the rebound effect and even social values in a broader sense.

Reference (Koji Takase, Yasushi Kondo, and Ayu Washizu, "An analysis of consumers' behavior by the waste input-output model: Environmental impact of income and time use" Transactions of the Institute of Life Cycle Assessment, Japan, 2-1 (2006), pp. 48-54) reports a model that predicts, on the basis of the utility maximization principle, a behavior when a consumption pattern changes under constraints on time and income, and calculates an environmental load caused by the behavior.

Reference assumes a rational human in standard economics. That is, a human is assumed to select a behavior to maximize the utility function. However, an actual human does not always select a rational behavior. In the prior art, it is therefore difficult to predict a human behavior based on realities of life under constraints on time and income.

As described above, conventionally, it is impossible to accurately predict a human behavior on the basis of realities of life.

BRIEF SUMMARY OF THE INVENTION

A behavior estimation apparatus includes:

a memory to store behavioral statistical data including an occurrence probability of each of a plurality of different kinds of behaviors of a human during each time period, the behaviors including replaceable behaviors, each of the replaceable behaviors being capable of replaced with another of the replaceable behaviors;

an input unit configured to input a plurality of conditions including a prediction period, and an annual consumption expenditure;

an extraction unit configured to extract, from the behavioral statistical data, the occurrence probability of each of the behaviors within the prediction period as a prior probability distribution;

an obtaining unit configure to obtain a consumption time ratio between the replaceable behaviors; and a calculation unit configured to calculate estimated occurrence probabilities of the behaviors which minimize a Kullback-Leibler divergence with respect to the prior probability distribution and satisfy a plurality of constraint conditions, the constrain conditions including (a) a first constrain condition that a ratio between estimated occurrence probabilities of the replaceable behaviors within the prediction period equals the consumption time ratio, (b) a second constrain condition that a sum of expenditures of the behaviors per unit time equals an expenditure per unit time calculated from the annual consumption expenditure, (c) a third constrain condition that a sum of the occurrence probabilities of the behaviors within the prediction period is "1", and (d) a fourth constrain condition that a sum of the estimated occurrence probabilities of the behaviors within the prediction period is "1".

BRIEF DESCRIPTION OF THE SEVERAL VIEWS OF THE DRAWING

FIG. 2 is a flowchart for explaining a processing operation of the behavior prediction system in FIG. 1;

FIG. 3 is a view showing an example of a behavior pattern stored in a behavioral statistical data storage unit 121;

FIGS. 4A and 4B are views showing another example of a behavior pattern stored in the behavioral statistical data storage unit 121;

FIG. 6 is a table showing a storage example of data that is stored in a unit data storage unit 125 and represents an environmental load unit (carbon dioxide emission) output per unit time of each behavior;

FIG. 10 is a table showing an example of reference data indicating behaviors that would not occur if the prediction target is staying in each place;

FIG. 11 is a view showing an example of an input window to input a place the prediction target would not visit during the prediction period;

FIG. 12 is a table showing a storage example of data that is stored in the unit data storage unit 125 and represents an energy amount consumed by each behavior per unit time;

FIG. 13 is a table showing a storage example of data that is stored in the unit data storage unit 125 and represents an accident occurrence degree of each behavior per unit time;

FIG. 14 is a block diagram showing an arrangement example of a behavior prediction system according to the seventh embodiment;

FIG. 16 is a table showing an example of a behavior pattern stored in a behavioral statistical data storage unit 121a;

FIG. 17 is a table showing an example of group data about a prediction target group;

FIG. 18 is a table A showing a prior probability distribution before correction and a table B showing estimated behavior probabilities obtained from the corrected prior probability distribution; and FIG. 19 is a table showing the estimated behavior time of each behavior, which is obtained for each class of the prediction target group, and the behavior probability (behavior pattern) of each behavior in the prediction target group.

DETAILED DESCRIPTION OF THE INVENTION

First Embodiment

Figure 1:
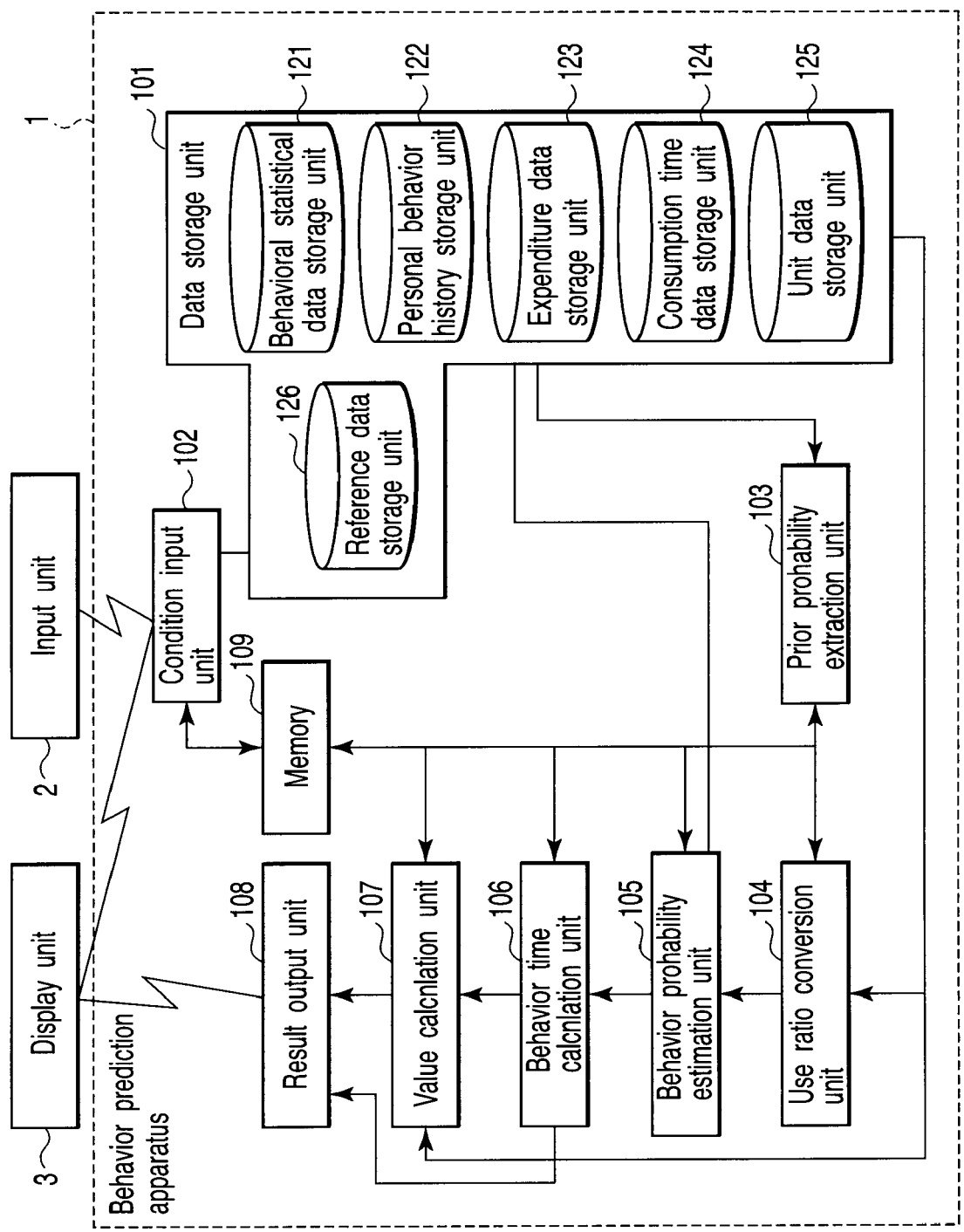
FIG. 1 is a block diagram showing an arrangement example of a behavior prediction system according to an embodiment.

As shown in FIG. 1, the behavior prediction system roughly includes a behavior prediction apparatus 1, input unit 2, and display unit 3. The behavior prediction apparatus 1 includes a data storage unit 101, condition input unit 102, prior probability extraction unit 103, use ratio conversion unit 104, behavior probability estimation unit 105, behavior time calculation unit 106, value calculation unit 107, result output unit 108, and memory 109.

The data storage unit 101 includes a behavioral statistical data storage unit 121, personal behavior history storage unit 122, expenditure data storage unit 123, consumption time data storage unit 124, unit data storage unit 125, and reference data storage unit 126.

In the behavior prediction system according to the first embodiment, the data storage unit 101 need only include at least the behavioral statistical data storage unit 121, expenditure data storage unit 123, consumption time data storage unit 124, and unit data storage unit 125.

The behavioral statistical data storage unit 121 stores a plurality of behavior patterns of standard persons each specified by, e.g., sex, age bracket, and annual consumption expenditure. The behavioral statistical data storage unit 121 stores each behavior pattern in association with attribute data including sex, age bracket, and annual consumption expenditure.

As shown in FIG. 3, a behavior pattern represents an average occurrence probability (behavior ratio) qi of each of behaviors (i) such as kitchen work, eating, using toilet, watching TV, commute, and work during each time period of each date.

FIG. 3 shows a behavior pattern of a woman in the 30-39 age bracket with an annual consumption expenditure of 4,000,000 to 5,000,000 yen during a time period.

The behavioral statistical data storage unit 121 stores behavior patterns as a table, as shown in FIG. 3. However, the present invention is not limited to this, and the behavior patterns can be stored in any other format. For example, the behavior patterns may be stored as a graph, as shown in FIG. 4.

Figure 4A:
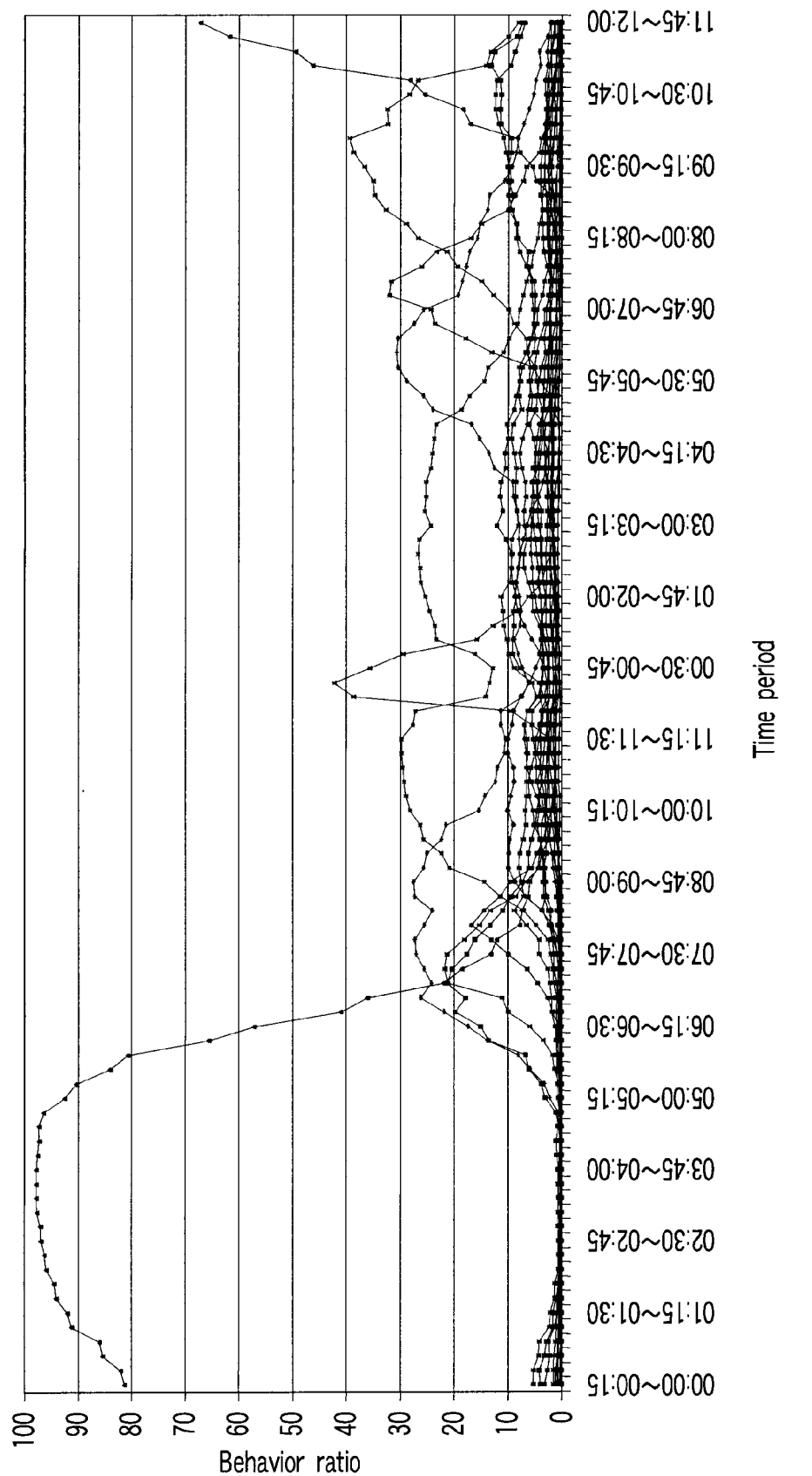

FIGS. 4A and 4B show a behavior pattern in a whole day, i.e., the occurrence probabilities of behaviors during all time periods.

Each behavior pattern specified by attribute data containing sex, age bracket, and annual consumption expenditure can be regarded to include the features of, e.g., the senses of values and habits of a group matching the attribute data on an average. As the attribute data becomes more detail, the features of the group matching the attribute data appear in the behavior pattern more conspicuously.

As shown in FIGS. 3, 4A and 4B, human behaviors are classified into a plurality of types. Especially, as shown in FIG. 3, move by "train", move by "car", and move by "walking" are replaceable behaviors to achieve the same purpose and each of the replaceable behaviors is capable of being replaced with another of the replaceable behaviors. These behaviors are classified as a behavior group "move".

Although not illustrated in FIG. 3, a behavior "cooking at home" for eating and a behavior "eating at restaurants" are also behaviors to achieve the same purpose and are replaceable with each other. These behaviors can be classified as a behavior group "eating". FIG. 3 shows "cooking at home" and "eating at restaurants" as one behavior "eating" without sub-classification.

The occurrence probability of each of the plurality of behaviors belonging to the same behavior group, like move by "train", move by "car", and move by "walking", (during each time period or during a prediction period to be described later) will be referred to as a consumption pattern in the group "move".

Placing focus on the behavior group "move", this embodiment estimates a change in the behavior time of each behavior during a prediction period when the consumption pattern of the group changes.

FIG. 2 is a flowchart for explaining a processing operation of the behavior prediction apparatus in FIG. 1. The processing operation of the behavior prediction apparatus in FIG. 1 will be described next with reference to FIG. 2 by exemplifying behavior prediction for an average human.

In step S1, the input unit 2 inputs a prediction period in a format of "year, month, day, hour, and minutes to year, month, day, hour, and minutes". The memory 109 temporarily stores the input prediction period via the condition input unit 102. The process advances to step S2. The input unit 2 inputs, as attribute data, the sex, age bracket, and annual consumption expenditure of a person who is a behavior prediction target. The memory 109 temporarily stores the input attribute data via the condition input unit 102.

The process advances to step S3. The priori probability extraction unit 103 extracts a behavior pattern corresponding to the prediction period and attribute data temporarily stored in the memory 109 from the behavioral statistical data storage unit 121 as a priori probability distribution.

That is, the priori probability distribution obtained by the priori probability extraction unit 103 indicates the occurrence probability of each behavior during the designated prediction period in the behavior pattern corresponding to the input attribute data. For example, FIG. 3 shows a priori probability distribution extracted on the basis of attribute data of a woman in the 30-39 age bracket with an annual consumption expenditure of 4,000,000 to 5,000,000 yen and a prediction period "4 February, 8:00 to 10:00".

In step S4, the input unit 2 inputs a use ratio by a functional unit (e.g., distance, time, and amount of money) between a plurality of behaviors belonging to the same behavior group. The memory 109 temporarily stores, via the condition input unit 102, the input use ratio of the behaviors in the group. For the behaviors belonging to, e.g., the behavior group "move", the use ratio by a moving distance between move by "train", move by "car", and move by "walking" is input as move (train):move (car):move (walking)=1:2:3.

Referring back to FIG. 1, the expenditure data storage unit 123 stores an expenditure required per functional unit defined in accordance with the functions of various kinds of behaviors. For, e.g., move by "train", move by "car", and move by "walking", one functional unit is a moving amount of 1 km. The expenditure data storage unit 123 stores train: 26 yen, car: 15 yen, and walking: 0 yen as expenditures corresponding to movement of 1 km by "train", "car", and "walking".

For, e.g., a behavior "washing", one functional unit is a washing weight of 1 kg. The expenditure data storage unit 123 stores an expenditure necessary for washing in weight of 1 kg. For a behavior "eating", one functional unit is a calorific intake of 1 kcal. The expenditure data storage unit 123 stores an expenditure necessary for a calorific intake of 1 kcal. For behaviors "using toilet", "watching TV", and "sleep", one functional unit is one action of the behaviors. The expenditure data storage unit 123 stores an expenditure necessary for one action of the behaviors.

The consumption time data storage unit 124 stores a time (consumption time) required per functional unit defined in accordance with the functions of various kinds of behaviors. For, e.g., move by "train", move by "car", and move by "walking", one functional unit is a moving amount of 1 km. The consumption time data storage unit 124 stores train: 0.014 hr, car: 0.016 hr, and walking: 0.2 hr as consumption times corresponding to movement of 1 km by "train", "car", and "walking".

For, e.g., a behavior "washing", one functional unit is a washing weight of 1 kg. The consumption time data storage unit 124 stores a consumption time necessary for washing in weight of 1 kg. For a behavior "eating", one functional unit is a calorific intake of 1 kcal. The consumption time data storage unit 124 stores a consumption time necessary for a calorific intake of 1 kcal. For behaviors "toilet", "TV watching", and "sleep", one functional unit is one action of the behaviors. The consumption time data storage unit 124 stores a consumption time necessary for one action of the behaviors.

Referring back to FIG. 2, in step S5, the use ratio conversion unit 104 converts the designated use ratio, i.e., move (train): move (car): move (walking)=1:2:3 into a consumption time ratio and an expenditure ratio by using the information stored in the expenditure data storage unit 123 and that stored in the consumption time data storage unit 124.

For example, the consumption time data storage unit 124 stores train: 0.014 hr, car: 0.016 hr, and walking: 0.2 hr per functional unit (1 km). The use ratio conversion unit 104 multiplies each consumption time by the previously input use ratio (1:2:3) represented by the functional unit, thereby calculating the consumption time ratio. That is, the consumption time ratio is 0.014 (train):0.032 (car):0.6 (walking) (when move by "train" is represented by I=N−2, move by "car" is represented by i=N−1, and move by "walking" is represented by i=N on the basis of FIG. 3, the consumption time ratio is given by $a_{N-2}:a_{N-1}:a_N$).

The expenditure data storage unit 123 stores train: 26 yen, car: 15 yen, and walking: 0 yen per functional unit (1 km). The use ratio conversion unit 104 multiplies each expenditure by the previously input use ratio (1:2:3) represented by the functional unit, thereby calculating the expenditure ratio. That is, expenditure ratio is 26 (train):30 (car):0 (walking) (given by $b_{N-2}:b_{N-1}:b_N$, as described above).

The process advances to step S6. The behavior probability estimation unit 105 estimates, under constraint conditions on the basis of the principle of entropy, a new behavior probability distribution from the priori probability distribution obtained by the priori probability extraction unit 103.

Let qi be the occurrence probability of each behavior i in the priori probability distribution, and pi be the estimated behavior probability (estimated occurrence probability) obtained for each behavior i. For move by "train" (i=N−2), move by "car" (i=N−1), and move by "walking" (i=N), the occurrence probabilities in the priori probability distribution are given by $q_{N-2}$, $q_{N-1}$, and $q_N$, and the behavior probabilities are given by $p_{N-2}$, $p_{N-1}$, and $p_N$. The consumption time ratio $a_{N-2}:a_{N-1}:a_N$ obtained in step S5 is 0.014 (train): 0.032 (car): 0.6 (walking), and the expenditure ratio $b_{N-2}:b_{N-1}:b_N$ is 26 (train):30 (car):0 (walking). Even for each behavior i except move by "train" (i=N−2), move by "car" (i=N−1), and move by "walking" (i=N), the behavior probability estimation unit 105 acquires a time $a_i$ and an expenditure $b_i$ required per functional unit by reading out them from the consumption time data storage unit 124 and expenditure data storage unit 123.

The behavior probability estimation unit 105 obtains the estimated behavior probability $p_i$ of each behavior i such that the difference between a cross entropy when the priori probability of the behavior i is $q_i$ and an entropy (degree of disorder) when the estimated behavior probability of the behavior i is $p_i$, i.e., the Kullback-Leibler divergence is minimized under constraint conditions such as the consumption time ratio for the estimated behavior probability $p_i$ of each behavior i, as indicated by expression (1). Note that the Kullback-Leibler divergence and its calculation method are described in Kapur, J. N. and Kesavan, H. K., "Entropy Optimization Principles with Applications", Academic Press, Inc., pp. 151-203.

$$\sum_i p_i \log p_i - \sum_i p_i \log q_i \qquad (1)$$

where q: priori probability, p: estimated behavior probability (estimated occurrence probability), i: behavior (i=1, ..., N).

Equations (2) to (5) are calculated as constraint conditions for expression (1).

The first constraint condition will be described. For a plurality of behaviors i=k1 to kn belonging to a behavior group of interest (e.g., move by "train" (i=N−2 (=k1)), move by "car" (i=N−1 (=k2)), and move by "walking" (i=N (=k3)) belonging to the group "move" in the above example), a constraint condition represented by $$p_{k1}/a_{k1} = p_{k2}/a_{k2} = \ldots = p_{kn}/a_{kn} \qquad (2)$$

is given to the estimated behavior probabilities $p_i$ of the plurality of behaviors i.

For, e.g., move by "train" (i=N−2 (=k1)), move by "car" (i=N−1 (=k2)), and move by "walking" (i=N (=k3)) belonging to the group "move", a constraint condition represented by $$p_{N-2}/a_{N-2} = p_{N-1}/a_{N-1} = p_N/a_N$$

is given.

The constraint condition given by equation (2) represents that the ratio of the estimated behavior probabilities of the behaviors belonging to the group of interest during the prediction period equals the consumption time ratio.

For example, a constraint condition for the consumption pattern of the behavior "move" is given by $$p_{k1}/0.014 = p_{k2}/0.032 = p_{k3}/0.6$$

where k1 is "train", k2 is "car", and k3 is "walking".

The second constraint condition for expression (1) will be described next. The second constraint condition is given by $$\sum_i \frac{p_i b_i}{a_i} = \frac{S \times C}{365 \times 24} \qquad (3)$$

where p: estimated behavior probability (estimated occurrence probability), i: behavior (i=1, ..., N), C: annual consumption expenditure [yen], S: expenditure variation coefficient (normally "1"), T: prediction period [h], $a_i$: consumption time per functional unit of a behavior i [time {h}], $b_i$: expenditure per functional unit of a behavior i [yen].

Note that the consumption times $a_i$ and expenditures $b_i$ per functional unit of behaviors i including move by "train", move by "car", and move by "walking" are obtained from the consumption time data storage unit 124 and expenditure data storage unit 123, as described above.

The expenditure variation coefficient S is the variation ratio of the annual consumption expenditure. If the annual consumption expenditure does not vary or is not taken into consideration, S=1.

The second constraint condition given by equation (3) represents that when each behavior i occurs in accordance with the estimated behavior probability $p_i$, the sum of expenditures per unit time (e.g., 1 hr) equals an expenditure per unit time (e.g., 1 hr) obtained from the annual consumption expenditure input as attribute data.

The fourth and fifth constraint conditions represented by $$\sum_i p_i = 1 \qquad (4)$$

$$\sum_i q_i = 1 \qquad (5)$$

are also given as the constraint conditions for expression (1).

The estimated behavior probability $p_i$ of each behavior i (i=1, ..., N) is obtained on the basis of expression (1) such that the difference between the cross entropy when the priori probability of the behavior i is $q_i$ and the entropy when the estimated behavior probability of the behavior i is $p_i$ is minimized under the constraint conditions of equations (2) to (5).

After the estimated behavior probability $p_i$ of each behavior i is obtained in the above-described way, the process advances to step S7. The behavior time calculation unit 106 calculates a behavior time of each behavior i during the prediction period.

That is, the behavior time calculation unit 106 multiplies the estimated behavior probability $p_i$ of each behavior i by the prediction period T, thereby obtaining the behavior time of the behavior i during the prediction period. For example, when prediction period T=20 hrs, and estimated behavior probability $p_i$ of a behavior i=0.2, the behavior time of the behavior i during the prediction period is 4.0 hrs.

Figure 5:
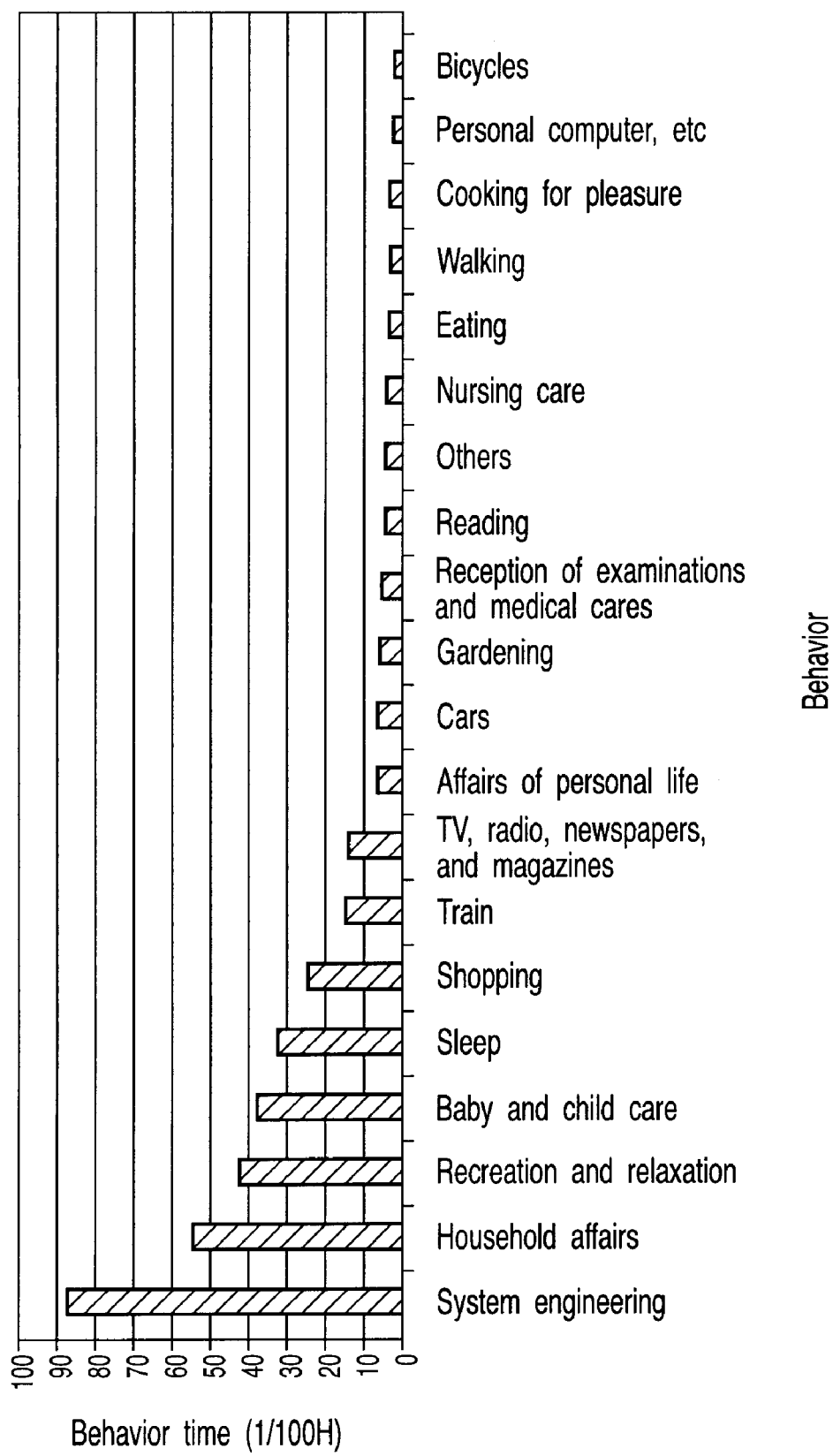
FIG. 5 is a view showing a display example of behavior times of behaviors during a prediction period.

FIG. 5 shows behavior times during the prediction period, which are obtained for the behaviors i by the behavior time calculation unit 106 when prediction period T=20 hrs. The result output unit 108 displays, on the display unit 3, the behavior times obtained for the behaviors i by the behavior time calculation unit 106, as shown in FIG. 5.

The process advances to step S8. The value calculation unit 107 calculates environmental loads by using the behavior times during the prediction period obtained for the behaviors i.

The unit data storage unit 125 stores the value of each environmental load unit (carbon dioxide emission in FIG. 6) output upon an action of each behavior per unit time (e.g., 1 hr), as shown in FIG. 6.

The value calculation unit 107 reads out the environmental load unit of each behavior i from the unit data storage unit 125. The value calculation unit 107 multiplies each readout environmental load unit by a behavior time during the prediction period obtained for a corresponding behavior i, thereby calculating the environmental load of the behavior i.

Figure 7:
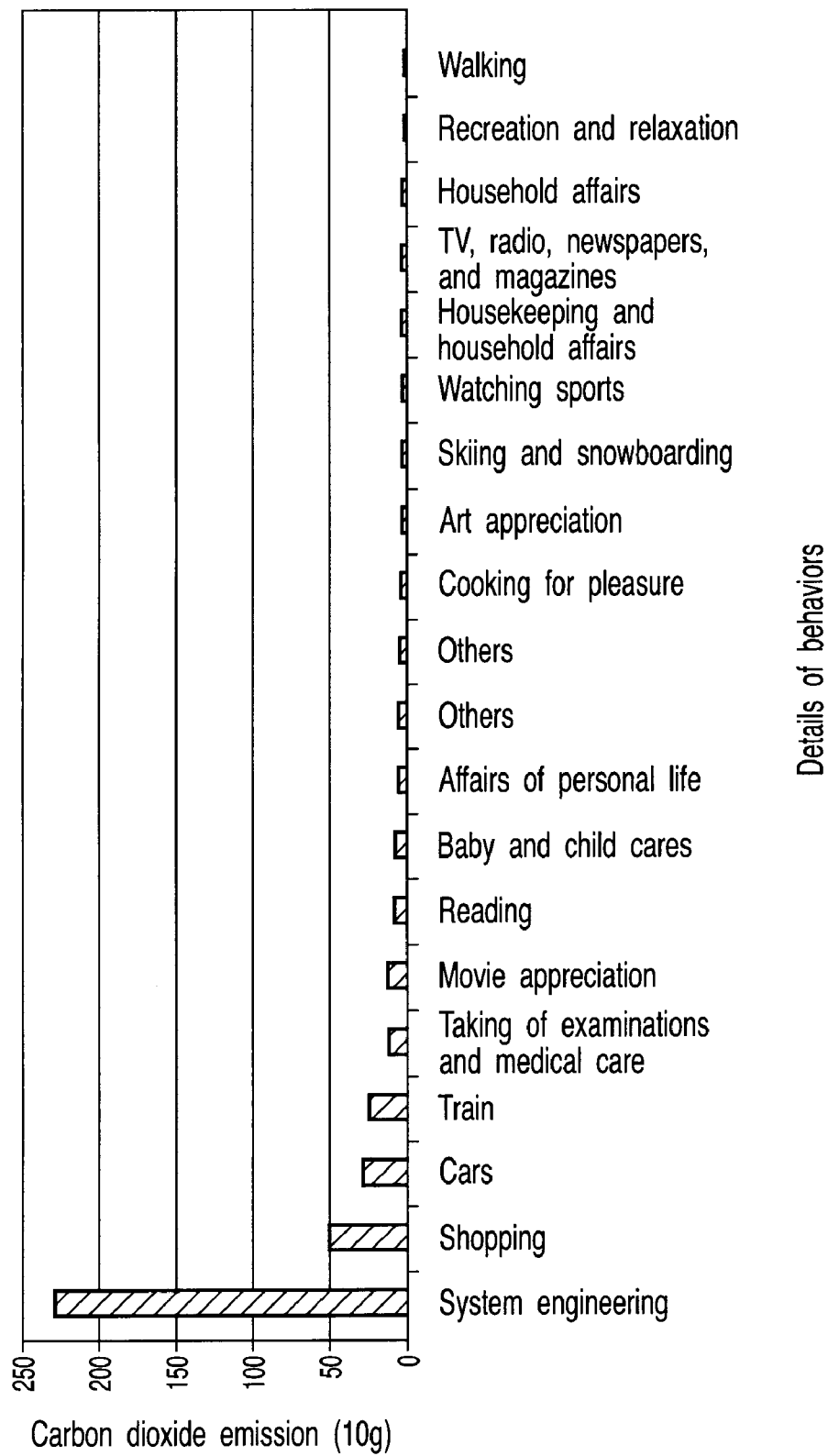
FIG. 7 is a view showing a display example of the environmental loads of behaviors.

FIG. 7 shows the environmental loads (carbon dioxide emissions) obtained for the behaviors i. The result output unit 108 displays, on the display unit 3, the environmental loads obtained for the behaviors i by the value calculation unit 107, as shown in FIG. 7.

As described above, according to the first embodiment, it is possible to predict, on the basis of the principle of entropy, a behavior (especially a behavior time) of a person who does not always behave according to the utility maximization principle.

That is, it is possible to predict the occurrence probability of a behavior such that it can obtain a maximum degree of freedom under the constraints of time and expenditure assuming the daily behavior pattern. When the prediction result and environmental load data are combined, environmental loads corresponding to a changed consumption pattern can be estimated.

Second Embodiment

In estimating the behavior probability distribution in step S6 in FIG. 2, if a behavior time during the prediction period can be predicted in advance for a specific behavior, constraints are given individually to an estimated behavior probability $p_i$ of the behavior i on the basis of the predicted behavior time.

In this case, it is also possible to give constraints individually to the behavior probabilities $p_i$ of behaviors belonging to the behavior group of interest or any other behaviors i on the basis of the predicted behavior times of the behaviors during the prediction period.

Figure 8:
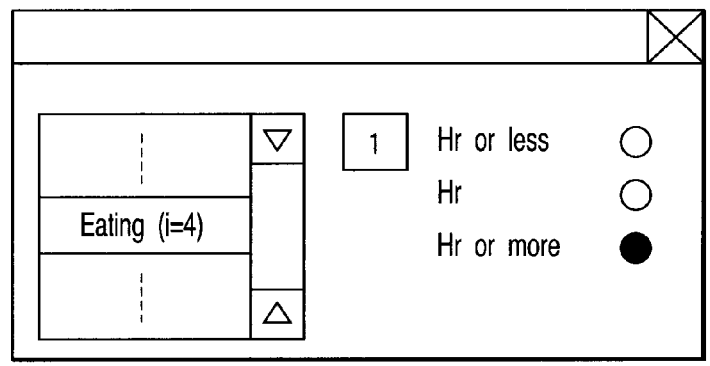
FIG. 8 is a view showing an example of an additional condition input window.

For example, in step S4 in FIG. 2, an input unit 2 inputs the predicted value of the behavior time or the predicted range (upper and lower limits) of the behavior time for the specific behavior whose behavior time during the prediction period is predicted in advance. FIG. 8 shows a display example of an input window (displayed on a display unit 3) at this time.

Let T be the prediction period, $p_i$ be the behavior probability of the specific behavior i, and Li be the predicted behavior time or the lower/upper limit of the predicted behavior time input for the specific behavior i. Data given by expression (6)

$$T \times p_i \geq L_i \text{ or } T \times p_i \leq L_i \text{ or } T \times p_i = L_i \qquad (6)$$

is input to a condition input unit 102 as an additional condition and temporarily stored in a memory 109.

A behavior probability estimation unit 105 generates a constraint condition for the behavior probability $p_i$ of the specific behavior i for the behavior time or range of the specific behavior input from the input unit 2 by using the previously input prediction period.

In the display window example shown in FIG. 8, a condition that the behavior time of the behavior "eating" (i=4) is at least 1 hr when the prediction period is 24 hrs is input. In this case, the behavior probability estimation unit 105 generates a constraint condition given by $$P_4 \geq 1/24 (= \text{input value/prediction period}) \qquad (7)$$

Constraint condition (7) is added to constraint condition (1) when the behavior probability estimation unit 105 estimates the behavior probability distribution in step S6 in FIG. 2. The behavior probability estimation unit 105 calculates the estimated behavior probability $p_i$ of each behavior i by calculating expression (1) by using constraint condition (7) in addition to equations (2) to (5).

For example, if it is obvious that a certain behavior does not occur during the prediction period, a time zero is input to the input window shown in FIG. 8 in correspondence with the behavior, thereby generating a constraint condition to set the estimated behavior probability of the behavior to zero.

For example, if it is obvious that a behavior "dishwashing" does not occur within the prediction period, the behavior probability estimation unit 105 generate a constraint condition $P_3$=0. The behavior probability estimation unit 105 calculates the estimated behavior probability $p_i$ of each behavior i by calculating expression (1) by using the constraint condition in addition to equations (2) to (5). In this case, a behavior probability $P_3$ of the behavior "dishwashing" calculated by the behavior probability estimation unit 105 is zero.

Third Embodiment

In the first embodiment, a priori probability distribution is extracted from a standard behavior pattern statistically obtained from many data. In the third embodiment, a priori probability distribution is extracted not from a standard behavior pattern but from the behavior history data of a specific person in step S3 in FIG. 9.

Extracting a priori probability distribution extracted not from a standard behavior pattern but from the actual behavior history data of a specific person allows to accurately predict the behavior of the specific person.

A personal behavior history storage unit 122 stores the same behavior pattern as in FIGS. 3, 4A and 4B in correspondence with identification information to identify an individual, including a name, ID number, and annual consumption expenditure.

Figure 9:
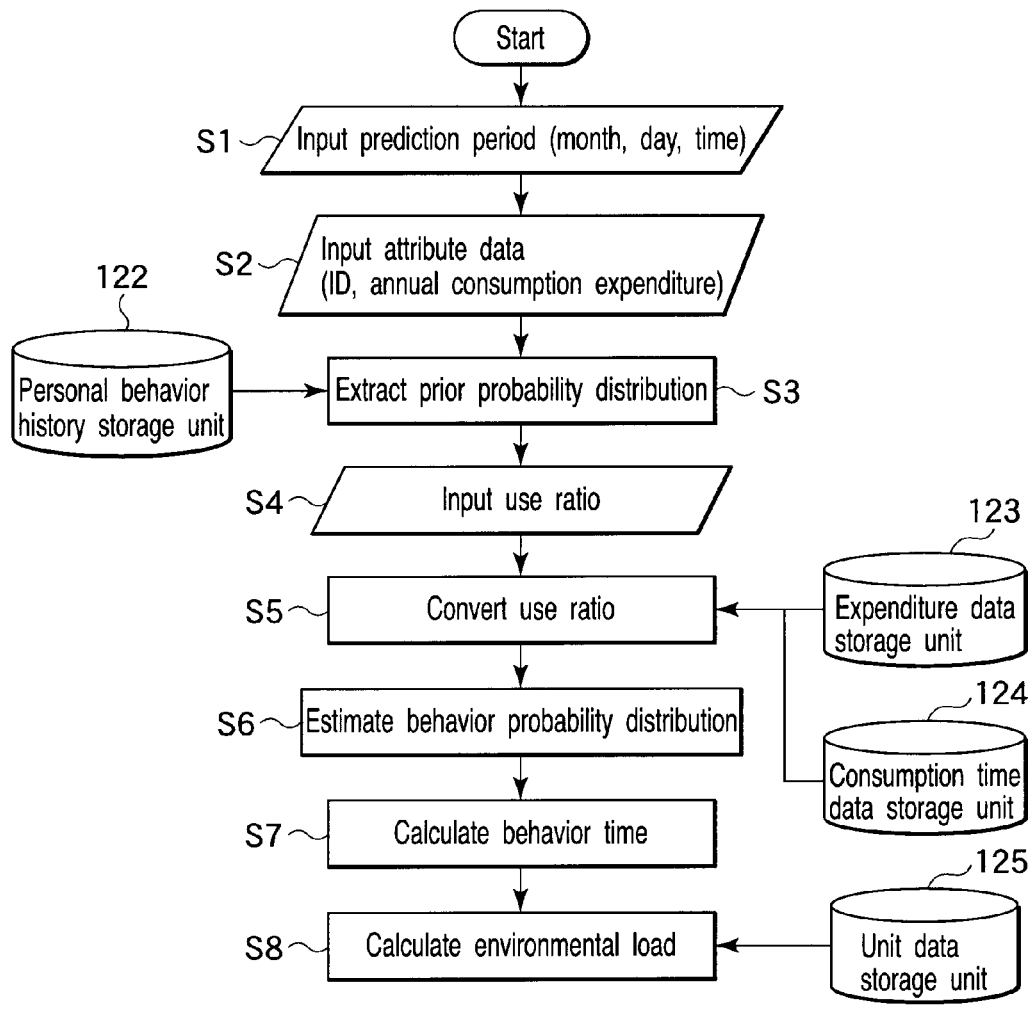
FIG. 9 is a flowchart for explaining another processing operation of the behavior prediction system in FIG. 1.

In step S2 in FIG. 9, data such as an ID number to identify an individual is input as attribute data. In step S3, a priori probability extraction unit 103 extracts a priori probability distribution from a behavior pattern corresponding to the input ID number by using a previously input prediction period, as in the first embodiment. The subsequent processes are the same as in the first embodiment.

As described above, according to the third embodiment, it is possible to predict the behavior probability and behavior time of a specific person in addition to the behavior probability and behavior time of a standard person during a prediction period.

Fourth Embodiment

A behavior probability estimation unit 105 can predict a change in behavior caused by a variation in income, i.e., an income rebound effect by omitting utilization of constraint condition (2) and setting an expenditure variation coefficient S in constraint condition (3) to a value except "1".

For example, an input unit 2 also inputs an income variation ratio in step S2 in FIG. 2. A memory 109 temporarily stores the input variation ratio via a condition input unit 102.

The behavior probability estimation unit 105 converts the variation ratio stored in the memory 109 into the expenditure variation coefficient S.

In estimating a behavior probability distribution in step S6 in FIG. 2, the behavior probability estimation unit 105 calculates expression (1) by using equations (3) to (5) and updating the expenditure variation coefficient S in equation (3) to the new value obtained by the conversion, thereby calculating a behavior probability $p_i$ of each behavior i.

For example, if a condition that the income would increase by 10% is input, S=1.1. If the income would decrease by 10%, S=0.9.

Fifth Embodiment

For a behavior j such as bowling that can be practiced only in a specific place and does not occur in a place where the prediction target stays within the prediction period, expression (1) is solved while adding a limitation ($p_j$=0) defining that the behavior does not occur to the constraint. It consequently becomes possible to predict the influence of the behavior in a free time considering the prediction time period, i.e., a time rebound effect.

A reference data storage unit 126 stores, in correspondence with each place, reference data representing behaviors that do not occur when the prediction target is staying in that place, as shown in FIG. 10.

In addition to a prediction period and attribute data to specify a behavior pattern, an input unit 2 inputs, e.g., a place the prediction target would not visit within the prediction period from an input window shown in FIG. 11.

If a place the prediction target would not visit is input, a condition input unit 102 obtains the behaviors j that do not occur within the prediction period by referring to the reference data shown in FIG. 10. More specifically, the sum of behaviors stored in correspondence with each input place is obtained. Of all behaviors, behaviors contained in the obtained sum are the behaviors j that do not occur within the prediction period.

A memory 109 stores the behaviors j that are obtained by the condition input unit 102 and do not occur within the prediction period. A behavior probability estimation unit 105 generates a constraint condition $p_j$=0 for each behavior j that does not occur within the prediction period.

The behavior probability estimation unit 105 calculates a behavior probability Pi of each behavior i by calculating expression (1) while adding the constraint. In this case, a behavior probability $p_j$ of the behavior j calculated by the behavior probability estimation unit 105 is zero.

As described above, according to the fourth and fifth embodiments, the income rebound effect and time rebound effect can also be predicted. Hence, the system can be used to determine, e.g., the providing time period or target customers of a new online service.

Sixth Embodiment

In the first embodiment, the environmental load of each behavior i is obtained by using the environmental load unit data of the behavior.

In the sixth embodiment, a unit data storage unit 125 stores an energy amount to be consumed by a behavior per unit time in correspondence with each behavior, as shown in FIG. 12.

In this case, a value calculation unit 107 reads out the consumption energy amount per unit time of each behavior i from the unit data storage unit 125. The value calculation unit 107 multiplies the obtained consumption energy amount per unit time by a behavior time within a prediction period, which is obtained for each behavior i, thereby calculating the consumption energy of the behavior i within the prediction period.

The unit data storage unit 125 also stores an accident occurrence degree per unit time of each behavior as shown in FIG. 13.

In this case, the value calculation unit 107 reads out the accident occurrence degree per unit time of each behavior i from the unit data storage unit 125. The value calculation unit 107 multiplies the obtained accident occurrence degree per unit time by a behavior time within a prediction period, which is obtained for each behavior i, thereby calculating the cumulative accident occurrence degree of the behavior i within the prediction period.

As described above, if the behavior time of each behavior i within a prediction period is obtained by the method described in the first embodiment, various kinds of value calculations can be done by using the behavior time of each behavior within the prediction period.

It is therefore possible to predict various social values of behaviors, including the consumption energy and accident occurrence degree.

Seventh Embodiment

As described in the first embodiment, the behavioral statistical data storage unit 121 in FIG. 1 stores behavioral statistical data representing the occurrence probability of each of a plurality of kinds of behaviors of a standard person during each time period, i.e., the behavior pattern shown in FIG. 3 or 4. The behavior pattern of the standard person is generally statistically obtained from the behavior patterns of many unspecified persons. The prior probability extraction unit 103 in FIG. 1 extracts a prior probability distribution from the behavior pattern.

In the seventh embodiment, the behavior pattern of a person who belongs to a specific group (e.g., a group of employees of a specific company, a group of pupils of a specific school, and a group of residents of a specific area) is estimated from the behavior pattern of the standard person stored in the behavioral statistical data storage unit 121 by using the same method as in the first embodiment.

For example, if it is impossible to express the behavior pattern of a specific prediction target group by using general behavioral statistical data because of the specialty of the group, the prior probability distribution used in the first embodiment can be estimated in association with the specific group by using the general behavioral statistical data and information unique to the specific group in the seventh embodiment.

The seventh embodiment will be described below.

The same reference numerals as in FIG. 1 denote the same parts in FIG. 14, and only different parts will be described. More specifically, the behavioral statistical data storage unit 121 in FIG. 1 is replaced with a first behavioral statistical data storage unit 121a and a second behavioral statistical data storage unit 121b in FIG. 14. The behavior probability estimation unit 105 in FIG. 1 is replaced with a first behavior probability estimation unit 105a and a second behavior probability estimation unit 105b in FIG. 14. The second behavioral statistical data storage unit 121b in FIG. 14 is the same as the behavioral statistical data storage unit 121 in FIG. 1. The second behavior probability estimation unit 105b in FIG. 14 is the same as the behavior probability estimation unit 105 in FIG. 1.

The first behavioral statistical data storage unit 121a stores a plurality of behavior patterns of standard persons each specified by, e.g., a sex and age bracket in correspondence with time periods, like the behavioral statistical data storage unit 121 in FIG. 1.

Like FIG. 3, FIG. 16 shows a table of a plurality of behavior patterns of persons of both sexes and respective age brackets in a time period, which are stored in the first behavioral statistical data storage unit 121a. FIG. 16 shows an average behavior time of each behavior in a time period. The occurrence probability of each behavior in the time period can be obtained by dividing the behavior time of each behavior by the time of the period.

The first behavior probability estimation unit 105a estimates the behavior pattern of the target group by using the behavior patterns shown in FIG. 16.

The second behavioral statistical data storage unit 121b stores the behavior pattern of the target group estimated by the first behavior probability estimation unit 105a.

The processing operation of the behavior prediction apparatus in FIG. 14 will be described below with reference to the flowchart in FIG. 15.

A description will be done by exemplifying a group shown in FIG. 17. FIG. 17 shows data (group data) about a behavior pattern prediction target group (prediction target group). Members of a group in Kanagawa Prefecture are classified into a plurality of classes (subgroups) corresponding to both sexes and respective age brackets. The number of members belonging to each class (e.g., the number of group members of each sex and the number of group members of each age bracket) and the total number of group members are shown in FIG. 17. The group data may contain the ratio of the number of members of each class to the total number of members of the group in place of or together with the number of members of each class. The group data may also contain attribute data such as the residence area and name of the target group.

In the group data shown in FIG. 17, the group members are classified into a plurality of classes on the basis of their sexes and age brackets. However, the present invention is not limited to this. When the group data contains the attribute data items of each group member, including the place of residence (address) and job title, in addition to the sex and age bracket, the group members may be classified into a plurality of classes by using at least one of the attribute data items.

In step S101, an input unit 2 inputs a prediction period in a format of "year, month, day, hour, and minutes to year, month, day, hour, and minutes". A memory 109 temporarily stores the input prediction period via a condition input unit 102. The process advances to step S102. The input unit 2 inputs data about the prediction target group, i.e., the group data as shown in FIG. 17. The memory 109 temporarily stores the input group data via the condition input unit 102.

The process advances to step S103. A prior probability extraction unit 103 extracts, from the first behavioral statistical data storage unit 121a as a prior probability distribution, the occurrence probability (behavior pattern) of each behavior during the prediction period in correspondence with each sex and each age bracket (i.e., each class) on the basis of the prediction period and group data temporarily stored in the memory 109.

For example, table A in FIG. 18 shows a prior probability distribution extracted on the basis of the data of a class "men in the 15-24 age bracket" in the group data and a prediction period "February 4, 8:00 to 10:00".

In step S104, the input unit 2 inputs a known occurrence probability or behavior time (known data) of a behavior during the prediction period for the prediction target group. The memory 109 temporarily stores the input known data via the condition input unit 102. If the known data changes depending on sex and age bracket, known data corresponding to the sex and age bracket is input in association with the prior probability distribution extracted for the sex and age bracket.

In, e.g., the prediction target group shown in FIG. 17, it is found in advance by measurements and surveys that the behavior times of behaviors "associations and companies", "talking of examinations and medical care", and "others" are "0" during the prediction period for the class "men in the 15-24 age bracket", or these behaviors are impossible in the place where the prediction target group stays. Hence, known data "0" is input to the behavior times or occurrence probabilities of these behaviors.

The process advances to step S105. The first behavior probability estimation unit 105a corrects the prior probability distribution of each sex and age bracket extracted in step S103 by using the input known data. In, e.g., the prior probability distribution shown in table B in FIG. 18, the behavior times of the behaviors "associations and companies", "talking of examinations and medical care", and "others" are "0". For this reason, the behavior times and occurrence probabilities of these behaviors are corrected to "0".

The process advances to step S106. The first behavior probability estimation unit 105a estimates a new behavior probability distribution from the corrected prior probability distribution on the basis of the principle of entropy by using expression (1), as in the first embodiment.

Let $q_i$ be the occurrence probability of each behavior i in the corrected prior probability distribution, and $p_i$ be the estimated behavior probability (estimated occurrence probability) obtained for each behavior i ($0 \leq p_i \leq 1$, $0 \leq q_i \leq 1$). In the corrected prior probability distribution, let k be a behavior whose occurrence probability is corrected by known data, and $t_k$ be the known data of the behavior k. The prior probability of the behavior k is $q_k$, and the estimated behavior probability (estimated occurrence probability) obtained for the behavior k is $p_k$.

As the constraint conditions for expression (1), a constraint condition given by $$P_k = t_k \tag{8}$$

is used in addition to the constraint conditions of equations (4) and (5) used in the first embodiment.

The constraint condition of equation (8) indicates that in the prior probability distribution, the estimated occurrence probability $p_k$ of the behavior k whose occurrence probability is corrected by the known data $t_k$ equals the known data $t_k$.

The first behavior probability estimation unit 105a obtains, from expression (1) under the constraint conditions of equations (4), (5), and (8), the estimated behavior probability $p_i$ of each behavior i (i=1, ..., N) which minimizes the difference between a cross entropy when the prior probability of the behavior i is $q_i$ and an entropy when the estimated behavior probability of the behavior i is $p_i$.

The table B in FIG. 18 shows the estimated behavior probabilities $p_i$ of the behaviors i estimated from the prior probability distribution before correction shown in the table B in FIG. 18 in the above-described way. As shown in the table B in FIG. 18, the estimated behavior probabilities $p_i$ of behaviors "associations and companies", "talking of examinations and medical care", and "others" whose prior probabilities are corrected by the known data "0" remain "0".

With this above-described process, the estimated behavior probability $p_i$ of each behavior i is obtained in correspondence with each sex and age bracket (each class).

The process advances to step S107. The first behavior probability estimation unit 105a calculates the behavior time (estimated behavior time) of each behavior i during the prediction period on the basis of the estimated behavior probability $p_i$ of each behavior corresponding to each sex and age bracket (each class), as shown in the table B in FIG. 18.

More specifically, the estimated behavior time of each behavior i during the prediction period is calculated by multiplying the estimated behavior probability $p_i$ of the behavior i by a prediction period T. For example, if prediction period T=20 hrs, and estimated behavior probability $p_i$ of behavior i=0.2, the estimated behavior time of the behavior i during the prediction period is 4.0 hrs.

The above-described process (steps S103 to S107) is executed for all classes of the prediction target group, thereby obtaining the estimated behavior probability $p_i$ and estimated behavior time of each behavior i during the prediction period in correspondence with each class of the prediction target group.

FIG. 19 shows the estimated behavior time of each behavior i during the prediction period, which is obtained for each class of the prediction target group.

The process advances to step S108. In step S108, the first behavior probability estimation unit 105a calculates the behavior probability of each behavior in the prediction target group, i.e., the standard behavior pattern of the prediction target group on the basis of the group data of the prediction target group and the behavior time of each behavior obtained for each sex and age bracket (each class) as shown in FIG. 19.

Figure 15:
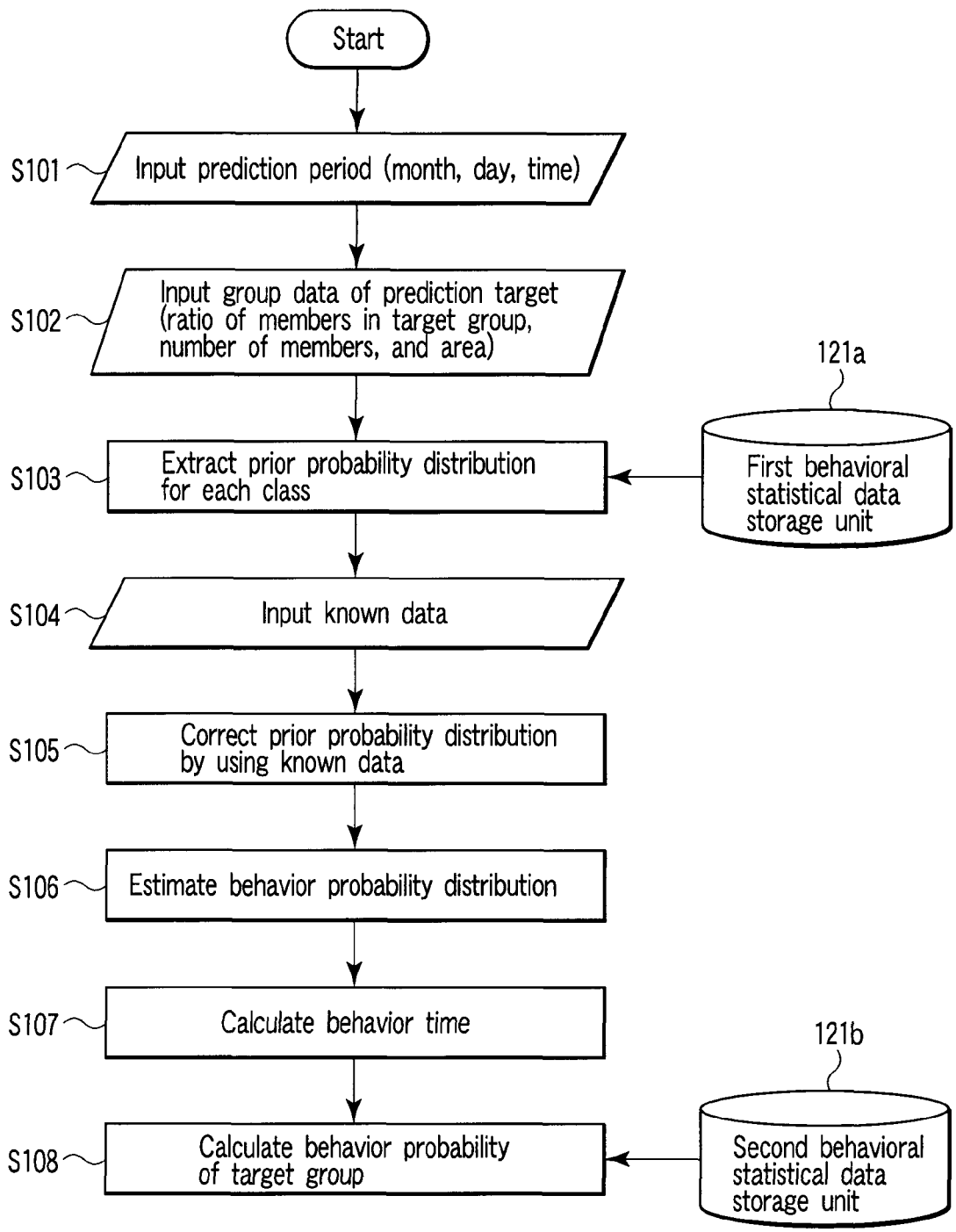
FIG. 15 is a flowchart for explaining a processing operation of the behavior prediction system in FIG. 14.

For example, the first behavior probability estimation unit 105a multiplies the estimated behavior time of each behavior of the class "men in the 15-24 age bracket" shown in FIG. 15 by the number of men in the 15-24 age bracket of the prediction target group, thereby obtaining the sum of the behavior times of each behavior of the class.

As shown in FIG. 19, for each class (e.g., a class of men in the age 25-34 bracket and a class of women in the age 25-34 bracket, as shown in FIG. 17) belonging to the prediction target group, the sum of the behavior times of each behavior is obtained in the same way.

As shown in FIG. 19, a sum sum(i) (i=behavior) of the behavior times of each behavior is calculated for all classes. A sum S of the behavior times of all behaviors is obtained.

A behavior probability P(i) of each behavior (i) of the prediction target group can be obtained by $$P(i) = \text{sum}(i)/S \tag{10}$$

The first behavior probability estimation unit 105a stores, in the second behavioral statistical data storage unit 121b, the behavior probability (occurrence probability) P(i) of each behavior (i) of the prediction target group obtained in the above-described manner.

As described above, the second behavioral statistical data storage unit 121b stores the behavior pattern of a specific group having a predetermined feature in the behavior pattern. The behavior prediction apparatus described in the first embodiment extracts a prior probability distribution from behavior patterns stored in the second behavioral statistical data storage unit 121b and executes the process described in the first embodiment, as in FIG. 2, thereby predicting the behavior unique to the group.

More specifically, in step S1 of FIG. 2, the input unit 2 inputs a prediction period in a format of "year, month, day, hour, and minutes to year, month, day, hour, and minutes". In step S2, the input unit 2 inputs, as attribute data, the sex, age bracket, and annual consumption expenditure of a person who is a behavior prediction target. In step S3, the prior probability extraction unit 103 extracts a behavior pattern corresponding to the prediction period and attribute data temporarily stored in the memory 109 from the second behavioral statistical data storage unit 121b as a prior probability distribution.

In step S4, the input unit 2 inputs a use ratio by a functional unit (e.g., distance, time, and amount of money) of a plurality of behaviors belonging to the same behavior group. In step S5, a use ratio conversion unit 104 converts the designated use ratio, i.e., move (train):move (car):move (walking)=1:2:3 into a consumption time ratio and an expenditure ratio by using information stored in an expenditure data storage unit 123 and that stored in a consumption time data storage unit 124.

The process advances to step S6. The second behavior probability estimation unit 105b estimates, under constraints on the basis of the principle of entropy, a new behavior probability distribution from the prior probability distribution obtained by the prior probability extraction unit 103.

The succeeding process is the same as in FIG. 2, and a description thereof will be omitted.

As described above, according to the seventh embodiment, a behavior probability (prior probability distribution) about a group having no behavioral statistical data can be estimated. It is possible to accurately estimate the behavior of the group by using the prior probability distribution.

The methods described in the above embodiments (especially the functions of the condition input unit 102, prior probability extraction unit 103, use ratio conversion unit 104, behavior probability estimation unit 105 (first behavior probability estimation unit 105a and second behavior probability estimation unit 105b), behavior time calculation unit 106, value calculation unit 107, and result output unit 108) described in the above embodiments can be stored in a recording medium such as a magnetic disk (e.g., a flexible disk or hard disk), an optical disk (e.g., a CD-ROM or DVD), or a semiconductor memory and distributed as a program executable by a computer.

As described above, according to the embodiments above, it is possible to provide the behavior prediction apparatus and method capable of accurately predicting a human behavior, which is not always rational, on the basis of realities of life by using behavioral statistical data that compiles human behavior patterns.

What is claimed is:

1. A behavior estimation apparatus comprising:
    a memory to store behavioral statistical data including an occurrence probability of each of a plurality of different kinds of behaviors of a human during each time period, the behaviors including replaceable behaviors, each of the replaceable behaviors being capable of replaced with another of the replaceable behaviors;
    an input unit configured to input a plurality of conditions including a prediction period, and an annual consumption expenditure;
    an extraction unit configured to extract, from the behavioral statistical data, the occurrence probability of each of the behaviors within the prediction period as a prior probability distribution;
    an obtaining unit configure to obtain a consumption time ratio between the replaceable behaviors; and
    a calculation unit configured to calculate estimated occurrence probabilities of the behaviors which minimize a Kullback-Leibler divergence with respect to the prior probability distribution and satisfy a plurality of constraint conditions, the constrain conditions including (a) a first constrain condition that a ratio between estimated occurrence probabilities of the replaceable behaviors within the prediction period equals the consumption time ratio, (b) a second constrain condition that a sum of expenditures of the behaviors per unit time equals an expenditure per unit time calculated from the annual consumption expenditure, (c) a third constrain condition that a sum of the occurrence probabilities of the behaviors within the prediction period is "1", and (d) a fourth constrain condition that a sum of the estimated occurrence probabilities of the behaviors within the prediction period is "1".

2. The apparatus according to claim 1, further comprising:
    a second calculation unit configured to calculate a behavior time of each behavior within the prediction period based on the estimated occurrence probabilities of the behaviors.

3. The apparatus according to claim 2, further comprising:
    a environmental load calculation unit configured to calculate an environmental load generated within the prediction period by multiplying an environmental load generated per unit time of each behavior by the behavior time of the behavior.

4. The apparatus according to claim 2, further comprising:
    a first value calculation unit configured to calculate an energy to be consumed within the prediction period by multiplying a consumption energy per unit time of each behavior by the behavior time of the behavior.

5. The apparatus according to claim 2, further comprising:
    a second value calculation unit configured to calculate a cumulative accident occurrence degree within the prediction period by multiplying an accident occurrence degree per unit time of each behavior by the behavior time of the behavior.

6. The apparatus according to claim 1, wherein
    the conditions further include, as an additional condition, at least one of (a) a predicted behavior time of a behavior of the behaviors during the prediction period, and (b) a lower limit value and an upper limit value of the predicted behavior time, and
    wherein the constraint conditions include a fifth constraint condition for the estimated occurrence probability of the behavior for which the additional condition is designated, the fifth constraint condition being generated from the additional condition and the prediction period.

7. The apparatus according to claim 1, wherein the extraction unit extracts the prior probability distribution from the behavioral statistical data that is specified by attribute information including sex, age bracket, and annual consumption expenditure.

8. The apparatus according to claim 1, wherein the extraction unit extracts the prior probability distribution from the behavioral statistical data of a specific person.

9. The apparatus according to claim 1, wherein the constraint conditions include a sixth constraint condition that an estimated occurrence probability of a behavior of the behaviors that does not occur within the prediction period is zero.

10. The apparatus according to claim 1, wherein
the conditions include a variation ratio with respect to the annual consumption expenditure, and the apparatus further comprising:
a third calculation unit configured to calculate the estimated occurrence probabilities of the behaviors which minimize a Kullback-Leibler divergence with respect to the prior probability distribution and satisfy the third constraint condition, the fourth constraint condition, and a seventh constraint condition that the sum of the expenditures of the behaviors per unit time equals an expenditure per unit time calculated from an amount obtained by multiplying the annual consumption expenditure by the variation ratio.

11. The apparatus according to claim 1, wherein the behavioral statistical data stored in the memory includes the occurrence probabilities of the behaviors of a specific group.

12. A behavior estimation method including:
storing, in a memory, behavioral statistical data including an occurrence probability of each of a plurality of different kinds of behaviors of a human during each time period, the behaviors including replaceable behaviors, each of the replaceable behaviors being capable of replaced with another of the replaceable behaviors;
inputting a plurality of conditions including a prediction period, and an annual consumption expenditure;
extracting, from the behavioral statistical data, the occurrence probability of each of the behaviors within the prediction period as a prior probability distribution;
obtaining a consumption time ratio between the replaceable behaviors; and
calculating estimated occurrence probabilities of the behaviors which minimize a Kullback-Leibler divergence with respect to the prior probability distribution and satisfy a plurality of constraint conditions, the constrain conditions including (a) a first constrain condition that a ratio between estimated occurrence probabilities of the replaceable behaviors within the prediction period equals the consumption time ratio, (b) a second constrain condition that a sum of expenditures of the behaviors per unit time equals an expenditure per unit time calculated from the annual consumption expenditure, (c) a third constrain condition that a sum of the occurrence probabilities of the behaviors within the prediction period is "1", and (d) a fourth constrain condition that a sum of the estimated occurrence probabilities of the behaviors within the prediction period is "1"; and
calculating a behavior time of each behavior within the prediction period based on the estimated occurrence probabilities of the behaviors.

13. The method according to claim 12, further including:
calculating an environmental load generated within the prediction period by multiplying an environmental load generated per unit time of each behavior by the behavior time of the behavior.

14. The method according to claim 12, wherein
the conditions further include, as an additional condition, at least one of (a) a predicted behavior time of a behavior of the behaviors during the prediction period, and (b) a lower limit value and an upper limit value of the predicted behavior time, and
wherein the constraint conditions further include a fifth constraint condition for the estimated occurrence probability of the behavior for which the additional condition is designated, the fifth constraint condition being generated from the additional condition and the prediction period.

15. The method according to claim 12, wherein the constraint conditions include a sixth constraint condition that an estimated occurrence probability of a behavior of the behaviors that does not occur within the prediction period is zero.

16. The method according to claim 12, wherein
the conditions include a variation ratio with respect to the annual consumption expenditure, and the method further including:
calculating the estimated occurrence probabilities of the behaviors which minimize a Kullback-Leibler divergence with respect to the prior probability distribution and satisfy the third constraint condition, the fourth constraint condition, and a seventh constraint condition that the sum of the expenditures of the behaviors per unit time equals an expenditure per unit time calculated from an amount obtained by multiplying the annual consumption expenditure by the variation ratio.

17. A behavior estimation apparatus comprising:
a first memory to store first behavioral statistical data including an occurrence probability of each of a plurality of different kinds of behaviors of a human during each time period;
an input unit configured to input a plurality of conditions including the number of members belonging to a prediction target group and a prediction period;
an extraction unit configured to extract, from the first behavioral statistical data, the occurrence probability of each of the behaviors within the prediction period as a prior probability distribution;
a correcting unit configured to correct at least one occurrence probability in the prior probability distribution to a known occurrence probability in the group, to obtain a corrected prior probability distribution;
a first calculation unit configured to calculate estimated occurrence probabilities of the behaviors which minimize a Kullback-Leibler divergence with respect to the corrected prior probability distribution and satisfy a plurality of constraint conditions, the constrain conditions including (a) a first constraint condition that a sum of the occurrence probabilities of the behaviors within the prediction period is "1", (b) a second constraint condition that a sum of the estimated occurrence probabilities of the behaviors within the prediction period is "1"; and (c) a third constraint condition that the estimated occurrence probability of a behavior whose occurrence probability is known in the group equals the known occurrence probability;
a second calculation unit configured to calculate a behavior time of each behavior within the prediction period based on the estimated occurrence probabilities of the behaviors;
a third calculation unit configured to calculate, for each behavior, a sum of behavior times of the members in the group based on the behavior time of each behavior and the number of members of the group;
a forth calculation unit configured to calculate, based on the sum, a occurrence probability of each behavior of the group within the prediction period; and
a second memory to store the occurrence probability of each behavior of the group as second behavioral statistical data.

18. A behavior estimation apparatus comprising:
a first memory to store first behavioral statistical data including an occurrence probability of each of a plurality of different kinds of behaviors of a human during each time period;
an input unit configured to input (a) a prediction period and (b) group data concerning a prediction target group including a plurality of classes obtained by classifying members of the group according to at least one of attribute items including sex and age of each member of the group, the group data including the number of members of each class or a ratio of the number of members of each class to the total number of members of the group;
an extraction unit configured to extract, for each class, the occurrence probability of each behavior within the prediction period from the first behavioral statistical data as a prior probability distribution of the class;
a correcting unit configured to correct at least one occurrence probability in the prior probability distribution of each class to a known occurrence probability in the class or the group, to obtain a corrected prior probability distribution of each class;
a first calculation unit configured to calculate, for each class, estimated occurrence probabilities of the behaviors which minimize a Kullback-Leibler divergence with respect to the corrected prior probability distribution of the class and satisfy a plurality of constraint conditions, the constrain conditions including (a) a first constraint condition that a sum of the occurrence probabilities of the behaviors within the prediction period is "1", (b) a second constraint condition that a sum of the estimated occurrence probabilities of the behaviors within the prediction period is "1", and (c) a third constraint condition that the estimated occurrence probability of a behavior whose occurrence probability is known equals the known occurrence probability;
a second calculation unit configured to calculate, for each class, a behavior time of each behavior within the prediction period based on the estimated occurrence probabilities of the behaviors;
a third calculation unit configured to calculate, for each behavior, a sum of behavior times of members in the group based on the behavior time of the behavior calculated for each class and the number of members of each class;
a fourth calculation unit configured to calculate, based on the sum, a occurrence probability of each behavior of the group within the prediction period; and
a second memory to store the occurrence probability of each behavior of the group as second behavioral statistical data.

19. A behavior estimation method including:
storing, in a first memory, first behavioral statistical data including an occurrence probability of each of a plurality of different kinds of behaviors of a human during each time period;
inputting (a) a prediction period and (b) group data concerning a prediction target group including a plurality of classes, the group data including the number of members of each class or a ratio of the number of members of each class to the total number of members of the group;
extracting, for each class, the occurrence probability of each behavior within the prediction period from the first behavioral statistical data as a prior probability distribution of the class;
correcting at least one occurrence probability in the prior probability distribution of each class to a known occurrence probability in the class or the group, to obtain a corrected prior probability distribution of each class;
calculating, for each class, estimated occurrence probabilities of the behaviors which minimize a Kullback-Leibler divergence with respect to the corrected prior probability distribution of the class and satisfy a plurality of constraint conditions, the constrain conditions including (a) a first constraint condition that a sum of the occurrence probabilities of the behaviors within the prediction period is "1", (b) a second constraint condition that a sum of the estimated occurrence probabilities of the behaviors within the prediction period is "1", and (c) a third constraint condition that the estimated occurrence probability of a behavior whose occurrence probability is known equals the known occurrence probability;
calculating, for each class, a behavior time of each behavior within the prediction period based on the estimated occurrence probabilities of the behaviors;
calculating, for each behavior, a sum of behavior times of members in the group based on the behavior time of the behavior calculated for each class and the number of members of each class;
calculating, based on the sum, a occurrence probability of each behavior of the group within the prediction period; and
storing, as second behavioral statistical data, the occurrence probability of each behavior of the group in a second memory.

* * * * *